(12) United States Patent
Seal et al.

(10) Patent No.: US 7,788,472 B2
(45) Date of Patent: Aug. 31, 2010

(54) INSTRUCTION ENCODING WITHIN A DATA PROCESSING APPARATUS HAVING MULTIPLE INSTRUCTION SETS

(75) Inventors: David James Seal, Cambridge (GB); Edward Colles Nevill, Huntingdon (GB)

(73) Assignee: ARM Limited, Cambridge (GB)

( * ) Notice: Subject to any disclaimer, the term of this patent is extended or adjusted under 35 U.S.C. 154(b) by 1073 days.

(21) Appl. No.: 10/781,883

(22) Filed: Feb. 20, 2004

(65) Prior Publication Data

US 2004/0255097 A1   Dec. 16, 2004

(30) Foreign Application Priority Data

Jun. 13, 2003   (GB)   ................... 0313770.0

(51) Int. Cl.
*G06F 9/30* (2006.01)
(52) U.S. Cl. .................................... 712/209
(58) Field of Classification Search .............. 712/209
See application file for complete search history.

(56) References Cited

U.S. PATENT DOCUMENTS

| | | | |
|---|---|---|---|
| 5,459,854 A * | 10/1995 | Sherer et al. .................. 713/1 |
| 5,781,753 A * | 7/1998 | McFarland et al. .......... 712/218 |
| 5,938,759 A | 8/1999 | Kamijo | |
| 6,002,881 A | 12/1999 | York et al. | |
| 6,209,087 B1 | 3/2001 | Cashman et al. | |
| 6,253,314 B1 | 6/2001 | Itoh | |
| 6,282,633 B1 | 8/2001 | Killian et al. | |
| 6,968,444 B1 * | 11/2005 | Kroesche et al. ............ 712/208 |
| 2002/0004897 A1 | 1/2002 | Kao et al. | |
| 2002/0188826 A1 | 12/2002 | Rose et al. | |
| 2004/0030856 A1 * | 2/2004 | Qureshi et al. ............. 711/202 |
| 2004/0059848 A1 * | 3/2004 | Chang et al. .................. 710/65 |

| | | | |
|---|---|---|---|
| 2005/0262329 A1 | 11/2005 | Krishnan et al. | |

FOREIGN PATENT DOCUMENTS

| | | |
|---|---|---|
| GB | 2 289 354 A | 11/1995 |
| GB | 2289354 | 11/1995 |
| JP | 11-65839 | 3/1888 |
| JP | 7-281890 | 10/1995 |
| JP | 9 512651 | 12/1997 |
| JP | 2002-503370 | 1/2002 |
| TW | 452693 | 9/2001 |
| TW | 525087 | 3/2003 |
| WO | WO 95/30187 | 11/1995 |

(Continued)

OTHER PUBLICATIONS dictionary.com. "Definition for subset". 2 pages, 1900-2005 (depending upon the entry).*

(Continued)

*Primary Examiner*—Eddie P Chan
*Assistant Examiner*—Robert Fennema
(74) *Attorney, Agent, or Firm*—Nixon & Vanderhye P.C.

(57) ABSTRACT

A data processing apparatus 2 is provided which supports two instruction sets. These two instruction sets share a common subset of instructions including at least one class of instructions, such as all of the coprocessor instructions. The common subset of instructions have the same instruction encoding once any differences due to storage order within memory have been compensated for e.g. endianness.

33 Claims, 7 Drawing Sheets

FOREIGN PATENT DOCUMENTS

WO            WO 98/57256          12/1998

OTHER PUBLICATIONS

Roberts, H Edward. Yates, William. "Altair 8800". pp. 1-5, Jan. 1975.*

Translation of Japanese official action, Aug. 22, 2006, in corresponding Japanese Application No. 2006-516359.

Abstract of Japanese Publication No. 09330219 A, Dec. 22, 1997.

Taiwanese Search Report mailed Nov. 2, 2008 in corresponding Taiwanese Application No. 093104149.

Written Opinion of the International Searching Authority mailed Aug. 26, 2005 in corresponding PCT Application No. PCT/GB2004/00206.

Krishnaswamy et al.; "Profile Guided Selection of ARM and Thumb Instructions", SIGPLAN Notices, Association for Computing Machinery, New York, vol. 37, No. 7, Jul. 2002, pp. 56-64, XP002309544.

* cited by examiner

BL instruction:

```
    First halfword (HW1)      Second halfword (HW2)
    15    11 10          0    15    11 10           0
   +-------+--------------+  +-------+--------------+
   | 11110 | xxxxxxxxxx   |  | 11101 | xxxxxxxxxx   |
   +-------+--------------+  +-------+--------------+
```

BLX instruction:

```
    First halfword (HW1)      Second halfword (HW2)
    15    11 10          0    15    11 10           0
   +-------+--------------+  +-------+--------------+
   | 11110 | xxxxxxxxxx   |  | 11111 | xxxxxxxxx0   |
   +-------+--------------+  +-------+--------------+
```

FIG. 2
PRIOR ART 16-bit instruction if ABCDE is in range 00000 to 11100:

```
    First/only halfword
    15    11 10          0
   +-------+--------------+
   | ABCDE | xxxxxxxxxx   |
   +-------+--------------+
```

32-bit instruction if ABCDE is 11101, 11110 or 11111:

```
    First halfword (HW1)      Second halfword (HW2)
    15    11 10          0    15                    0
   +-------+--------------+  +----------------------+
   | ABCDE | xxxxxxxxxx   |  | xxxxxxxxxxxxxxxx     |
   +-------+--------------+  +----------------------+
```

FIG. 3

ARM coprocessor instructions with bits[27:24] = 1100 or 1101:

```
 31   28 27 25 24 23 22 21 20 19   16 15   12 11    8 7     4 3      0
+------+-----+--+--+--+--+--+------+------+-------+-------+-----------+
| cond | 110 | 0| 0| 0| 0| x| xxxx | xxxx | cpnum | xxxxxxxx  |         Undefined
+------+-----+--+--+--+--+--+------+------+-------+-------+-----+-----+
| cond | 110 | 0| 0| 1| 0| 0| Rn   | Rd   | cpnum | opc   | CRm | MCRR
+------+-----+--+--+--+--+--+------+------+-------+-------+-----+-----+
| cond | 110 | 0| 0| 1| 0| 1| Rn   | Rd   | cpnum | opc   | CRm | MRRC
+------+-----+--+--+--+--+--+------+------+-------+-------+-----+-----+
| cond | 110 | P| U| N| W| 0| Rn   | CRd  | cpnum | offset        | STC
+------+-----+--+--+--+--+--+------+------+-------+------------+-----+
| cond | 110 | P| U| N| W| 1| Rn   | CRd  | cpnum | offset        | LDC
+------+-----+--+--+--+--+--+------+------+-------+------------+-----+
```

Note: (P,U,W) != (0,0,0) on the LDC and STC rows.

ARM coprocessor instructions with bits[27:24] = 1110:

```
 31   28 27    24 23      21 20   16 15   12 11    8 7     5 4 3    0
+------+--------+-----------+------+------+-------+-------+--+------+
| cond | 1110   | opc1      | CRn  | CRd  | cpnum | opc2  | 0| CRm  | CDP
+------+--------+-----------+--+---+------+-------+-------+--+------+
| cond | 1110   | opc1   | 0| CRn  | Rd   | cpnum | opc2  | 1| CRm  | MCR
+------+--------+--------+--+------+------+-------+-------+--+------+
| cond | 1110   | opc1   | 1| CRn  | Rd   | cpnum | opc2  | 1| CRm  | MRC
+------+--------+--------+--+------+------+-------+-------+--+------+
```

FIG. 4
PRIOR ART

Coprocessor instructions in the enhanced Thumb instruction set:

With HW1[11:8] = 1100 or 1101:

```
   First halfword (HW1)                        Second halfword (HW2)
    15   12 11  9  8  7  6  5  4 3      0      15  12 11     8 7    4 3     0
   +------+------+--+--+--+--+--+-------+     +------+-------+------+-------+
   | 111x | 110  | 0| 0| 0| 0| x| xxxx  |     | xxxx | cpnum | xxxxxxxx      |  Undefined
   +------+------+--+--+--+--+--+-------+     +------+-------+------+-------+
   | 111x | 110  | 0| 0| 1| 0| 0| Rn    |     | Rd   | cpnum | opc  | CRm   |  MCRR
   +------+------+--+--+--+--+--+-------+     +------+-------+------+-------+
   | 111x | 110  | 0| 0| 1| 0| 1| Rn    |     | Rd   | cpnum | opc  | CRm   |  MRRC
   +------+------+--+--+--+--+--+-------+     +------+-------+------+-------+
   | 111x | 110  | P| U| N| W| 0| Rn    |     | CRd  | cpnum | offset        |  STC
   +------+------+--+--+--+--+--+-------+     +------+-------+---------------+
   | 111x | 110  | P| U| N| W| 1| Rn    |     | CRd  | cpnum | offset        |  LDC
   +------+------+--+--+--+--+--+-------+     +------+-------+---------------+
```

Note: (P,U,W) != (0,0,0) on the LDC and STC rows.

With HW1[11:8] = 1110:

```
   First halfword (HW1)                        Second halfword (HW2)
    15  12 11    8 7     5 4 3     0          15  12 11     8 7   5 4 3    0
   +------+------+--------+-+------+         +------+-------+------+-+------+
   | 111x | 1110 | opc1   | CRn    |         | CRd  | cpnum | opc2 |0| CRm  |  CDP
   +------+------+--------+-+------+         +------+-------+------+-+------+
   | 111x | 1110 | opc1  |0| CRn   |         | Rd   | cpnum | opc2 |1| CRm  |  MCR
   +------+------+-------+-+-------+         +------+-------+------+-+------+
   | 111x | 1110 | opc1  |1| CRn   |         | Rd   | cpnum | opc2 |1| CRm  |  MRC
   +------+------+-------+-+-------+         +------+-------+------+-+------+
```

FIG. 5

```
     ARM unconditional        Byte        Thumb unconditional
     CDP instruction          address     CDP instruction
      7   5 4 3      0                     7    5 4 3      0
     +------+-+-------+                   +--------+-------+
     | opc2 |0| CRm   |      A            | opc1   | CRn   | )
     +------+-+-------+                   +--------+-------+ ) HW1
     | CRd    | cpnum |      A+1          |   111x1110     | )
     +--------+-------+                   +------+-+-------+
     | opc1   | CRn   |      A+2          | opc2 |0| CRm   | )
     +--------+-------+                   +------+-+-------+ ) HW2
     |     111x1110   |      A+3          | CRd    | cpnum | )
     +----------------+                   +--------+-------+
```

FIG. 6

INSTRUCTION ENCODING WITHIN A DATA PROCESSING APPARATUS HAVING MULTIPLE INSTRUCTION SETS

BACKGROUND OF THE INVENTION

1. Field of the Invention

This invention relates to the field of data processing systems. More particularly, this invention relates to data processing systems having multiple instruction sets and the way in which such multiple instruction sets may be encoded.

2. Description of the Prior Art

It is known to provide data processing systems with multiple instruction sets. An example of such data processing systems are processor cores produced by ARM Limited of Cambridge, England which support both the ARM and Thumb instruction sets. The ARM instruction set is a 32-bit instruction set and the Thumb instruction set is a 16-bit instruction set. Whilst data processing systems supporting multiple instruction sets allow an advantageous degree of flexibility in the way which program operations may be represented and can yield advantages such as improved code density, there is typically an increase in the amount of hardware needed to support the multiple instruction sets.

SUMMARY OF THE INVENTION

Viewed from one aspect the present invention provides apparatus for processing data, said apparatus comprising:

data processing logic operable to perform data processing operations; and an instruction decoder operable to decode program instructions specifying data processing operations to be performed by said data processing logic and to control said data processing logic to perform said data processing operations; wherein said instruction decoder is operable in a first mode in which program instructions of a first instruction set are decoded and in a second mode in which program instructions of a second instruction set are decoded, a subset of program instructions of said first instruction set having a common storage order compensated encoding with a subset of program instructions of said second instruction set and forming a common subset of instructions representing at least one class of instructions, said common subset of instructions controlling said data processing logic to perform the same data processing operations independent of whether said instruction decoder is operating in said first mode or said second mode.

The invention recognises that by arranging the encoding of the instruction sets such that a common subset share the same encoding (at least after any variations due to storage order, e.g endianness, have been compensated), then such systems can be advantageously simplified in their implementation and other aspects of their operation improved. As an example, common decoding logic and/common processing logic for implementing the processing operations specified may be more readily utilised with a reduction in hardware overhead needed to support multiple instruction sets.

In preferred embodiments of the present invention the class of instructions included within the common subset of instructions (class for example being considered to be a group of instructions with similar functionality such as the load/store instructions, the multiply instructions, etc) include co-processor instructions such that the same co-processor logic can be used by both the first instruction set and the second instruction set. This is strongly advantageous since many co-processor designs exist and may have been developed for only one instruction set and the ability to reuse this same co-processor design with a further instruction set represents a significant advantage. It is particularly preferred when all co-processor instructions are within the common subset such that complete interoperability of a common group of co-processors may be provided with either instruction set.

Whilst it will be appreciated that the first instruction set and the second instruction set can have many different characteristics, preferably the first instruction set is a fixed length instruction set, conveniently of 32-bit or 16-bit instructions, and the second instruction set is a variable length instruction set.

It will be appreciated that whilst the common subset of instructions perform common data processing operations, it is not necessarily the case that these common data processing operations will always produce the same result data values. This does not detract from the hardware saving and other advantages mentioned above, but may be the result of specific peculiarities associated with certain data values to be used as input operands depending upon which instruction set is being utilised. Examples of data values serving as input operands which may have instruction set specific peculiarities are the program counter value, which may be maintained relative to the instruction being executed to have a different value depending upon the instruction set used and/or the program status register value which may hold one or more bits indicating which instruction set is being used and accordingly have different values depending upon which instruction set is being used.

Viewed from another aspect the present invention provides a method of processing data, said method comprising the steps of:

performing data processing operations with data processing logic; and decoding with an instruction decoder program instructions specifying data processing operations to be performed by said data processing logic and controlling said data processing logic to perform said data processing operations; wherein in a first mode program instructions of a first instruction set are decoded and in a second mode program instructions of a second instruction set are decoded, a subset of program instructions of said first instruction set having a common storage order compensated encoding with a subset of program instructions of said second instruction set and forming a common subset of instructions representing at least one class of instructions, said common subset of instructions controlling said data processing logic to perform the same data processing operations independent of whether said instruction decoder is operating in said first mode or said second mode.

Viewed from a further aspect the present invention provides a computer program product having a computer program operable to control a data processing apparatus containing data processing logic operable to perform data processing operations, said computer program comprising:

program instructions of a first instruction set and program instructions of a second instruction set that control said data processing logic to perform said data processing operations; wherein a subset of program instructions of said first instruction set
 have a common storage order compensated encoding with
 a subset of program instructions of said second instruction
 set and form a common subset of instructions representing
 at least one class of instructions, said common subset of
 instructions controlling data processing logic to perform
 the same data processing operations independent of
 whether instructions of said first instruction set or of said
 second instruction set are being decoded.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates the encoding of BL and BLX instructions in the Thumb instruction set;

FIG. 3 illustrates how the encodings of 16-bit and 32-bit instructions are distinguished from each other in an enhanced version of the Thumb instruction set;

FIG. 4 illustrates the encodings of coprocessor instructions in the ARM instruction set;

FIG. 5 illustrates the encodings of unconditional coprocessor instructions in the enhanced version of the Thumb instruction set;

FIG. 6 illustrates the difference in storage order of an unconditional CDP coprocessor instruction in the ARM instruction set and the enhanced Thumb instruction set;

DESCRIPTION OF THE PREFERRED EMBODIMENTS

Figure 1:
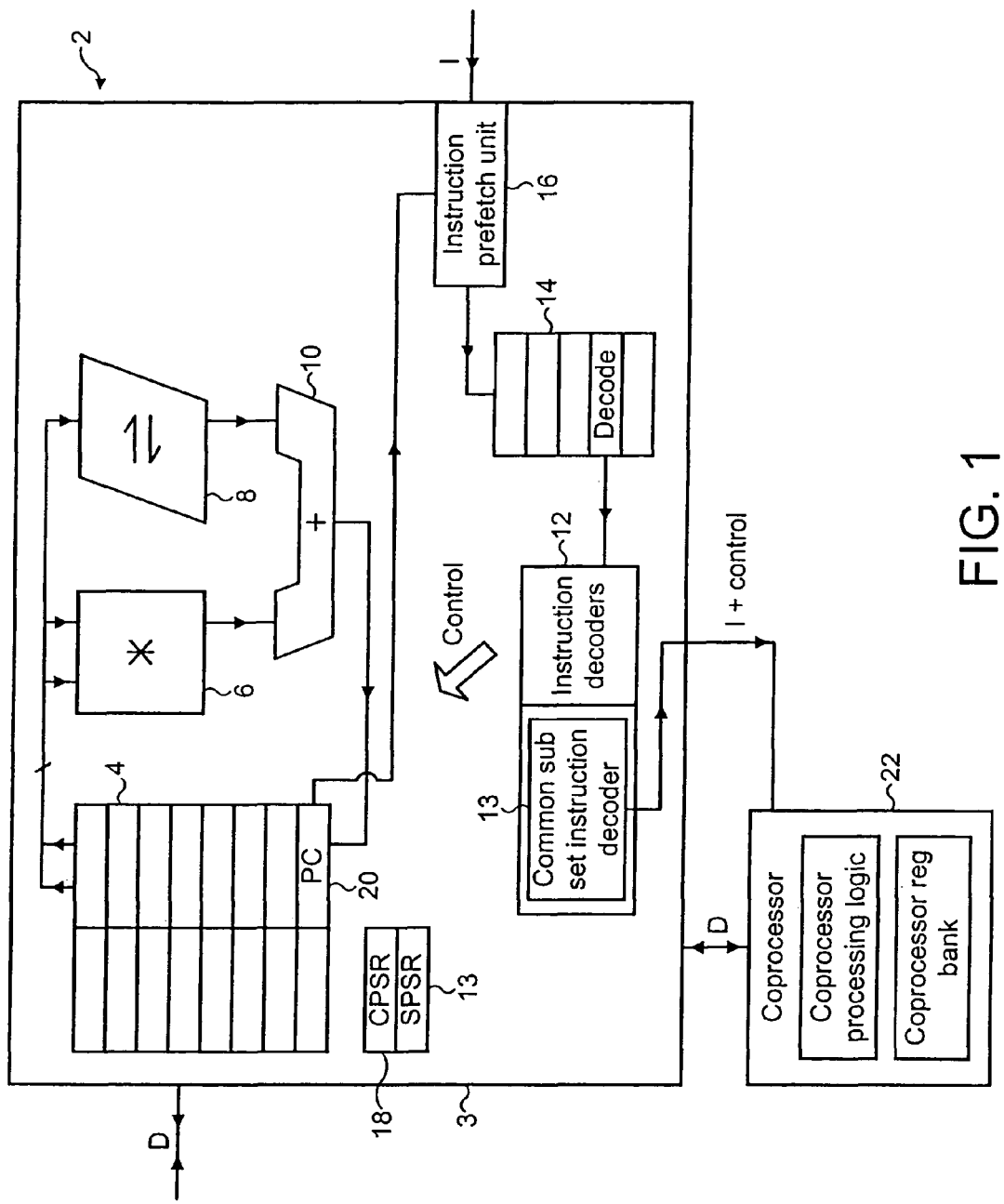
FIG. 1 schematically illustrates a data processing apparatus using multiple instruction sets and having an associated coprocessor.

FIG. 1 shows a data processing apparatus 2. The data processing apparatus 2 includes a processor core 3 containing a register bank 4, a multiplier 6, a shifter 8, an adder 10, instruction decoders 12 (including a common subset instruction decoder 13), an instruction prefetch buffer 14, an instruction prefetch unit 16 and program status registers 18. One of the registers within the register bank 4 is a program counter register 20 storing an address value having a predetermined relationship to the address value of the currently executing program instruction. This relationship can vary depending upon which instruction set is being used at the current time, e.g. current instruction address plus 4, current instruction address plus 8 etc. It will be appreciated that although only one coprocessor is shown in FIG. 1, multiple coprocessors could be attached, with instructions intended for execution by different coprocessors being distinguished by a coprocessor number field in each coprocessor instruction.

A coprocessor 22 is coupled to the processor core 3 and shares instruction words and data words with the processor core 3. The coprocessor 22 is responsive to coprocessor instructions within the instruction stream fetched by the instruction prefetch unit 16.

Coprocessor instructions are executed by the processor core 3 in conjunction with the coprocessor 22. In the illustrated apparatus, the coprocessor 22 has an internal register bank and internal data processing logic. Coprocessor instructions are identified by the common subset instruction decoder 12 and passed to the coprocessor together with control signals that determine when the coprocessor instruction is to be executed.

Some coprocessor instructions read all their operands from and write all their results to the coprocessor's internal register bank, and so require no further interaction with the processor core 3. Other coprocessor instructions require data values to be passed into the coprocessor 22. Possible sources for these data values include the register bank 4, the program status registers 18 and memory (not shown). In the illustrated apparatus, the processor core 3 obtains such data values from the desired location(s) and transfers them to the coprocessor 22 via the data interface D. Yet other coprocessor instructions transfer data values produced by the coprocessor 22 to destinations external to the coprocessor 22, such as the register bank 4, the program status registers 18 and memory. In the illustrated apparatus, such data values are transferred via the data interface D to the processor core 3, which writes them to the desired destination.

It will be appreciated that many variations on this type of coprocessor operation are possible and encompassed within the present technique. For example, the coprocessor 22 might lack an internal register bank, so that its internal data processing logic always acts on data values transferred from the processor core 3 via the data interface D and sends its result values back to the processor core 3 via the data interface D. A second example is that the coprocessor 22 might have a separate interface to memory, so that it can load data values from memory and store them to memory without involving the processor core 3. In this case, the data interface D is only used for data values coming from or going to locations within the processor core 3, such as the register bank 4 and the program status registers 18. Alternatively, the data interface D could be omitted entirely, so that data values can only be transferred between the processor core 3 and the coprocessor 22 by first storing them to memory from one and then loading them from memory into the other.

It will be appreciated that in operation program instructions are fetched from memory addresses within a memory (not illustrated) and passed to the instruction prefetch buffer 14. When the program instructions reach the decode stage within the instruction prefetch buffer 14, the instruction decoders 12 decode these instructions and generate control signals which are applied to the processing logic within the processor core 3, and the coprocessor 22 as necessary, to control these other elements to execute the data processing operation(s) specified. The processor core 3 is operable in a first mode in which a first instruction set is being decoded and in a second mode in which a second instruction set is being decoded. One way of indicating which mode the processor core 3 is in is to use a flag value within one of the program status registers 18. Depending upon which instruction set is currently active, the instruction decoders 12 will interpret the instructions received in accordance with the currently active instruction set and its encoding. In accordance with the present technique, the two instruction sets supported share a common encoding for a common subset of instructions, including at least one class of instructions, such as all unconditional coprocessor instructions, thereby enabling ready reuse of the same physical hardware to implement those common processing operations. It will be appreciated that the storage order of the program instructions from the different instruction sets may vary, such as due to endianness differences, instruction word size differences and the like, but the common subset of instructions share an encoding once such storage order differences have been compensated for as will be discussed hereafter.

In this example embodiment, the processor core 3 supports two instruction sets, the ARM instruction set and an enhanced version of the Thumb instruction set (see the ARM Architecture Reference Manual for details of the existing ARM and Thumb instruction sets). The enhancements to the Thumb instruction set include a change to its BL and BLX instructions that makes it possible to add a substantial number of 32-bit instructions.

Prior to the enhancement to the Thumb instruction set, its BL and BLX instructions consist of two successive halfwords in the instruction stream of the forms shown in FIG. 2. In valid programs, instruction halfwords whose most significant five bits are 11101, 11110 or 11111 only appear in pairs of these two forms. All other instructions other than BL and BLX consist of a single halfword whose most significant five bits are in the range 00000 to 11100.

An implementation can execute the two halfwords of a BL or BLX instruction in succession, and the combined effects of executing them in this manner produce the desired effect of the BL or BLX instruction, which is to perform a subroutine call to a Thumb subroutine (for BL) or an ARM subroutine (BLX). More precisely, it is to branch to a target address, switching over to the ARM instruction set if the instruction is BLX, and to place a pointer to the instruction following the second halfword in register 14, which is the subroutine link register in the ARM/Thumb instruction set architecture. The subroutine called can return by branching to this pointer.

Alternatively, an implementation can decode the two halfwords together as a 32-bit instruction and perform the desired effect of the BL or BLX instruction directly. In the unenhanced version of the Thumb instruction set, this is an optimisation that allows the BL or BLX instruction to be executed more efficiently, but is not essential.

The enhanced version of the Thumb instruction set instead requires that (under conditions to be described) two successive halfwords from the instruction stream are treated as a 32-bit instruction and not as two 16-bit halfwords to be executed in sequence with each other. Specifically, as shown in FIG. 3, if the top 5 bits of the next halfword to be executed take any of the values 00000 through to 11100, it is treated as a 16-bit instruction. If they take one of the values 11101, 11110 and 11111, it and the following halfword are treated together as a 32-bit instruction. All existing BL and BLX instructions are therefore required to be treated as 32-bit instructions.

All of the instructions of the unenhanced Thumb instruction set are still available in the enhanced version, BL and BLX as 32-bit instructions and all other instructions as 16-bit instructions. Comparing FIG. 2 with FIG. 3, it is apparent that only a small proportion of the available 32-bit instructions are BL and BLX instructions. The other 32-bit instructions can be used in the enhanced version to provide additional functionality not present in the unenhanced version. In particular, the ARM instruction set contains many groups of instructions that are not available in the unenhanced Thumb instruction set, and the 32-bit instructions other than BL and BLX can be used to provide Thumb equivalents of those instructions in the enhanced Thumb instruction set.

Coprocessor instructions are an example of such a group of instructions: they are present in the ARM instruction set but have no equivalents in the unenhanced version of the Thumb instruction set. ARM instructions are 32-bit words; when bits[27:24] of such an instruction take one of the values 1100, 1101 and 1110, the instruction is a coprocessor instruction. FIG. 4 shows the major groups of these instructions, which are:

LDC instructions, which transfer data values from memory into the coprocessor;

STC instructions, which transfer data values from the coprocessor to memory;

MCR instructions, which transfer a data value from a processor core register into the coprocessor;

MCRR instructions, which transfer two data values from processor core registers into the coprocessor;

MRC instructions, which transfer a data value from the coprocessor to a processor core register;

MRRC instructions, which transfer two data values from the coprocessor to processor core registers;

CDP instructions, which perform operations within the coprocessor that do not require data values to be transferred in or out of the coprocessor;

Undefined instructions, which cause an undefined instruction exception in the processor core 3.

All of these coprocessor instructions contain a cpnum field, which identifies the coprocessor for which the instruction is intended, and a cond field. The value of cond is 1110 or 1111 for unconditional coprocessor instructions, while values in the range 0000 to 1101 produce conditional versions of the equivalent instruction with cond=1110. (The unconditional instructions with cond=1111 do not have conditional versions.)

All of these coprocessor instructions can be executed on data processing apparatus 2, using the techniques described above.

Equivalent instructions to the unconditional ARM coprocessor instructions are encoded in the enhanced Thumb instruction set as shown in FIG. 5. Comparing this with FIG. 4, and noting that cond=1110 or 1111 for unconditional ARM instructions, it will be appreciated that the encoding of each unconditional Thumb coprocessor instruction is identical to that of the equivalent ARM coprocessor instruction apart from storage order considerations. Furthermore, all of these unconditional Thumb coprocessor instructions have encodings in which HW 1[15:11]=11101 or 11111, and so are 32-bit instructions according to the rule illustrated in FIG. 3.

The storage order considerations arise from the fact that ARM instruction words and Thumb instruction halfwords are normally stored in little-endian order, i.e. with their least significant byte at the lowest memory address. As an example, an ARM unconditional CDP instruction whose memory address is A will be held in the four bytes at addresses A, A+1, A+2 and A+3 as shown on the left hand side of FIG. 6. The equivalent instruction in the enhanced Thumb instruction set will be held with the first halfword HW1 at address A and the second halfword HW2 at address A+2, and so will result in the instruction being held in the four bytes as shown on the right hand side of FIG. 6. Comparing the two sides, the Thumb instruction consists of the same bytes as the ARM instruction, but in a different storage order: the bytes at addresses A and A+2 are swapped over relative to each other, as are the bytes at addresses A+1 and A+3. It will be appreciated that the same difference in storage order will exist for all of the unconditional coprocessor instructions, regardless of the precise instruction type.

The enhanced Thumb instruction set is a variable-length instruction set, containing both 16-bit and 32-bit instructions. The first step in decoding such an instruction set is to identify the individual instructions in the instruction prefetch buffer 14. In this embodiment, each entry in the instruction prefetch buffer 14 is a word-aligned word previously fetched from memory by the instruction prefetch unit 16. Denoting the entry at the head of the buffer as WORD1 and the next entry as WORD2, the instructions passed to the instruction decoders 12 are determined by the following rules:

| Current instruction set | Instruction address mod 4 | WORD1[15:11] | WORD1[31:26] | Instruction sent to decoder | |
|---|---|---|---|---|---|
| | | | | bits[31:16] | bits[15:0] |
| ARM | Always 0 | any | any | WORD1[31:16] | WORD1[15:0] |
| Thumb | 0 | 00000-11100 | any | 0 | WORD1[15:0] |
| Thumb | 0 | 11101-11111 | any | WORD1[15:0] | WORD1[31:16] |
| Thumb | 2 | any | 00000-11100 | 0 | WORD1[31:16] |
| Thumb | 2 | any | 11101-11111 | WORD1[31:16] | WORD2[15:0] |

This sends the correct instruction to the instruction decoder 12, with the storage order compensated for. It is always sent as 32 bits, with the most significant 16 bits being zero for a 16-bit Thumb instruction. It will be appreciated that for the Thumb instruction set, no separate bit is required to tell the instruction decoder 12 whether the instruction is a 16-bit instruction or a 32-bit instruction: the most significant bit of the 32 bits sent to the instruction decoder 12 is always 0 for a 16-bit instruction and 1 for a 32-bit instruction.

It will be appreciated that processor core implementations vary considerably as regards how they prefetch instructions and how many instructions they decode at a time, and therefore that this method of identifying the individual instructions will need to be modified according to these and other aspects of the processor core implementation.

There are two common existing ways to implement the instruction decoders 12 so that they can handle both the ARM and the Thumb instruction sets. In one, illustrated in FIG. 7, a Thumb-to-ARM converter contains logic that converts each Thumb instruction into the corresponding ARM instruction. Multiplexors select the original instruction if ARM code is being executed, or the converted instruction if Thumb code is being executed. The output of the multiplexors is then decoded by an ARM decoder.

This form of the instruction decoders 12 can be modified to decode the unconditional coprocessor instructions that have been included in the enhanced Thumb instruction set, by making the Thumb-to-ARM convertor pass the original instruction through unchanged to the multiplexor if bits[27:24] of the original instruction were 1100, 1101 or 1110 (these bits will always be 0000 for a 16-bit Thumb instruction, and some value other than 1100, 1101 or 1110 for a non-coprocessor 32-bit Thumb instruction). It will be appreciated that the enhanced Thumb instruction set may contain further 32-bit instructions besides BL, BLX and the unconditional coprocessor instructions; if it does, then further modifications will also be made to the Thumb-to-ARM converter to handle those instructions.

Figure 8:
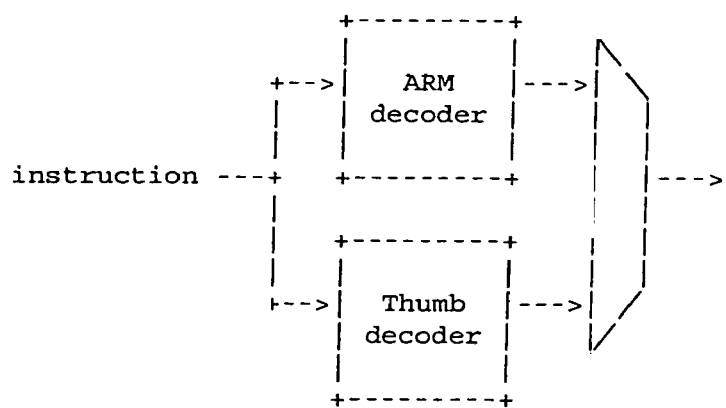
FIG. 8 illustrates a second way in which instruction decoders for the ARM and Thumb instruction sets can be designed.

The second common existing way to implement the instruction decoders 12 is to use separate decoders for the ARM and Thumb instruction sets, as illustrated in FIG. 8. Multiplexors are then used to select the outputs of the ARM decoder if ARM code is being executed, or the outputs of the Thumb decoder if Thumb code is being executed.

Figure 9:
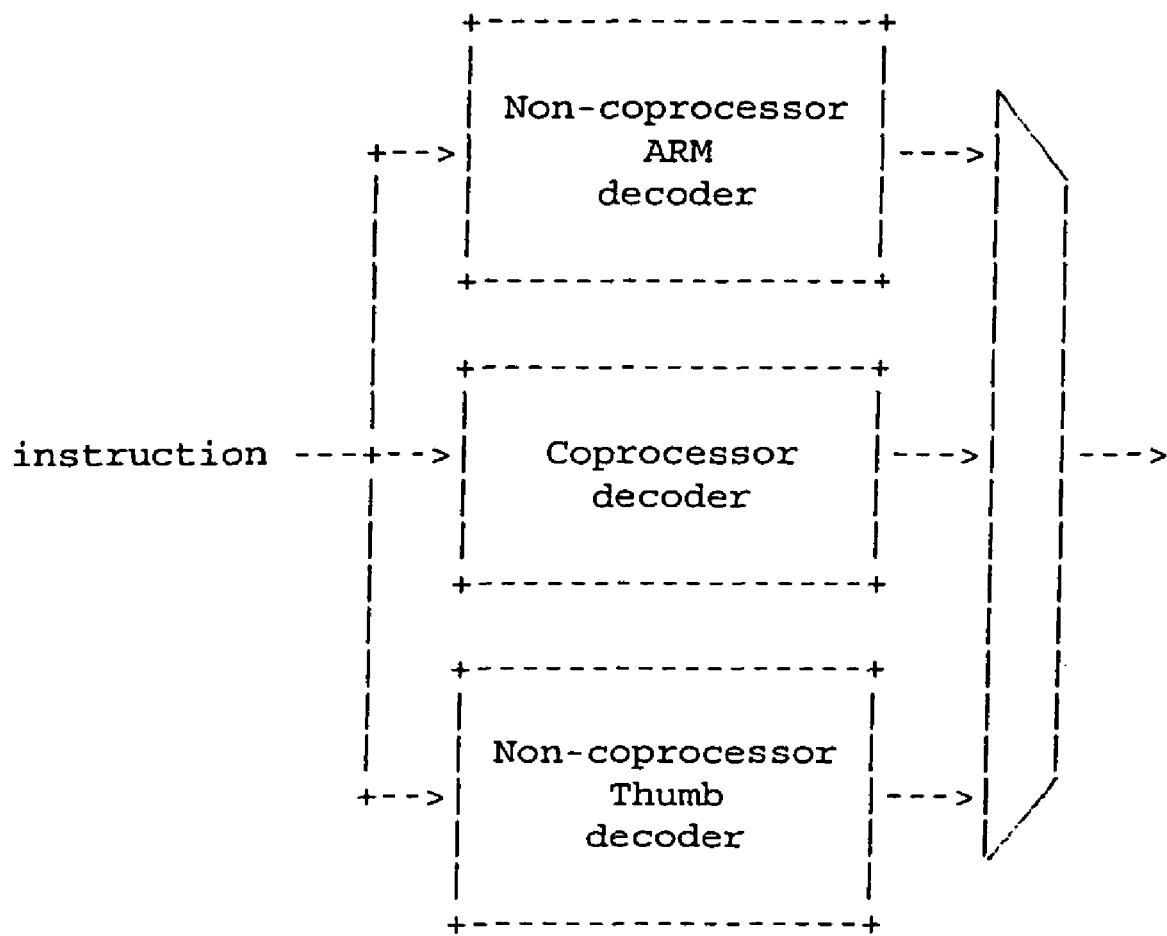
FIG. 9 illustrates how the instruction decoders of FIG. 8 are modified to decode the ARM and enhanced Thumb instruction sets.

This form of the instruction decoders 12 can be modified to decode the unconditional coprocessor instructions by splitting the ARM decoder into a part that decodes coprocessor instructions and a part that decodes non-coprocessor ARM instructions, as illustrated in FIG. 9. If the enhanced Thumb instruction set contains further 32-bit instructions besides BL, BLX and the unconditional coprocessor instructions, the non-coprocessor Thumb decoder is modified to handle them. The final multiplexors then select the outputs of the coprocessor decoder if bits[27:24] of the instruction are 1100, 1101 or 1110; otherwise, they select the outputs of the non-coprocessor ARM decoder if ARM code is being executed, or the outputs of the non-coprocessor Thumb decoder if Thumb code is being executed.

In the first form of the instruction decoders 12, the common subset instruction decoder 13 is the part of the ARM decoder that decodes coprocessor instructions. In the second form, it is the coprocessor decoder.

The use of a common storage order compensated encoding for the unconditional coprocessor instructions in the ARM and enhanced Thumb instruction sets has considerable advantages for both forms of the instruction decoders 12 compared with the use of different encodings in each instruction set, in terms of reducing the amount of logic required and the amount of power consumed. A further advantage is that the coprocessor 22 only needs to be able to execute the same instructions as it could before the enhancement to the Thumb instruction set. As well as avoiding increases in the logic required by coprocessors and the power they consume, this also means that existing coprocessors do not need to be modified to be usable from the enhanced Thumb instruction set.

Figure 7:
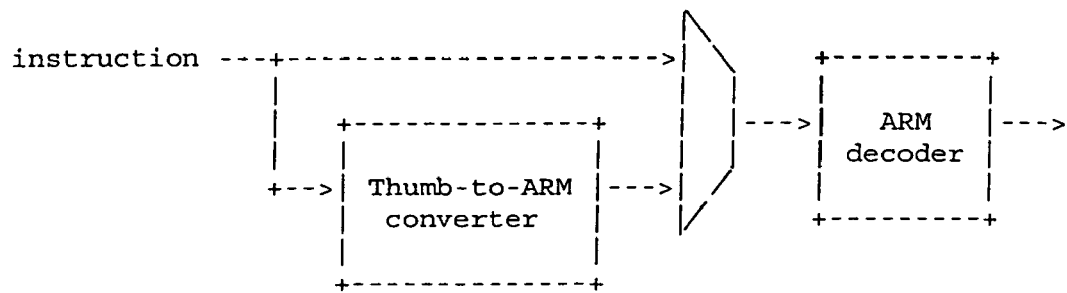
FIG. 7 illustrates a way in which instruction decoders for the ARM and Thumb instruction sets can be designed.

It will be appreciated that the technique described above can be modified to perform the storage order compensation at other places within the design, such as within the Thumb-to-ARM converter in FIG. 7, and that like any other logical design, it can be transformed into many logically equivalent designs. The present technique encompasses all such modifications and transformations.

Figure 10:
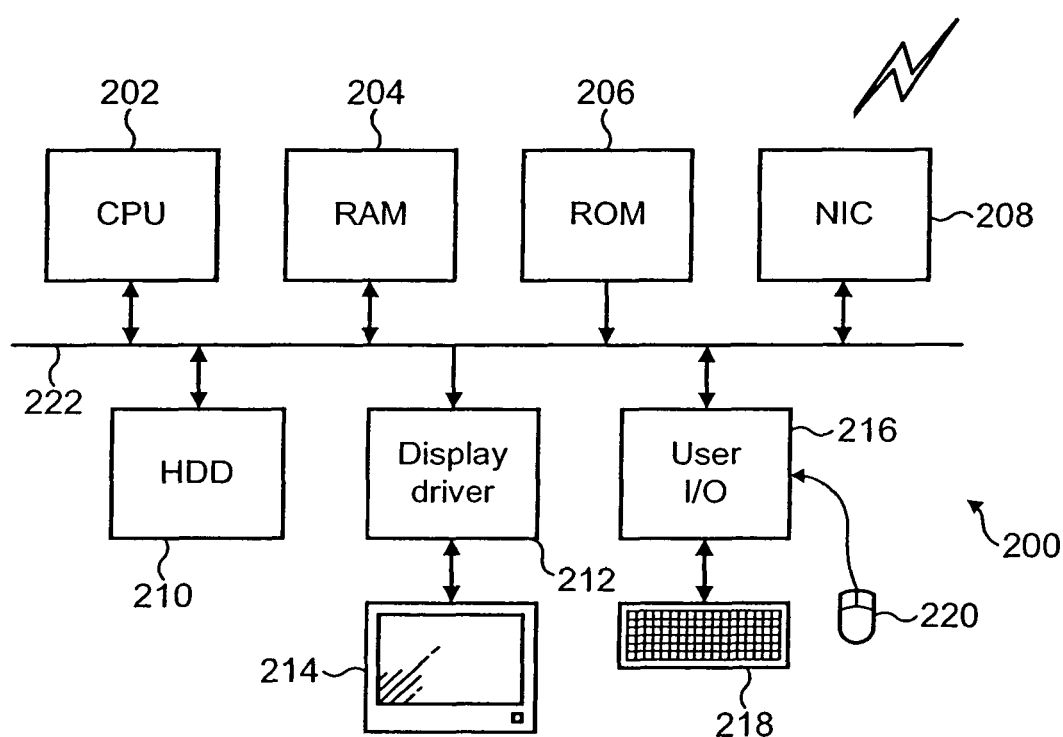
FIG. 10 schematically illustrates the architecture of a general purpose computer which may implement program instructions in accordance with the above described techniques.

FIG. 10 schematically illustrates a general purpose computer 200 which may implement program instructions in accordance with the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 10 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data, said apparatus comprising:
   data processing logic operable to perform data processing operations; and
   an instruction decoder operable to decode program instructions specifying data processing operations to be performed by said data processing logic and to control said data processing logic to perform said data processing operations; wherein
   said instruction decoder is operable in a first mode in which program instructions of a first instruction set are decoded and in a second mode in which program instructions of a second instruction set are decoded, a subset of program instructions of said first instruction set having a common bit-length and a common storage order compensated encoding with a subset of program instructions of said second instruction set such that, after compensating for storage order differences, all bits are identical and forming a common subset of instructions representing at least one class of instructions, said common subset of instructions controlling said data processing logic to perform the same data processing operations independent of whether said instruction decoder is operating in said first mode or said second mode.

2. The apparatus as claimed in claim 1, wherein said instruction decoder is operable to use common portions of said data processing logic to execute instructions of said common subset of instructions.

3. The apparatus as claimed in claim 1, wherein said common subset of instructions includes a class of instructions being coprocessor instructions operable to control coprocessor data processing operations using coprocessor logic common to said first instruction set and said second instruction set.

4. The apparatus as claimed in claim 3, wherein all unconditional coprocessor instructions are within said common subset.

5. The apparatus as claimed in claim 1, wherein said first instruction set is a fixed length instruction set of N-bit instructions.

6. The apparatus as claimed in claim 5, wherein N is one of 32 or 16.

7. The apparatus as claimed in claim 1, wherein said second instruction set is a variable length instruction set.

8. The apparatus as claimed in claim 1, wherein at least one program instruction within said common subset of instructions performs common data processing operations in either said first mode or said second mode but generates different result data values depending upon whether said instruction decoder is operating in said first mode or said second mode.

9. The apparatus as claimed in claim 8, wherein said at least one program instruction generating different result data values includes a program counter value as an input operand.

10. The apparatus as claimed in claim 9, wherein a different relationship is maintained between said program counter value and an address of an instruction being executed depending upon whether said instruction decoder is operating in said first mode or said second mode.

11. The apparatus as claimed in claim 8, wherein said at least one program instruction generating different result data values includes a program status register value as an input operand.

12. A method of processing data, said method comprising the steps of:
    performing data processing operations with data processing logic; and
    decoding with an instruction decoder program instructions specifying data processing operations to be performed by said data processing logic and controlling said data processing logic to perform said data processing operations; wherein
    in a first mode program instructions of a first instruction set are decoded and in a second mode program instructions of a second instruction set are decoded, a subset of program instructions of said first instruction set having a common storage order compensated encoding with a subset of program instructions of said second instruction set and forming a common subset of instructions representing at least one class of instructions, said common subset of instructions controlling said data processing logic to perform the same data processing operations independent of whether said instruction decoder is operating in said first mode or said second mode.

13. The method as claimed in claim 12, wherein common portions of said data processing logic are used to execute instructions of said common subset of instructions.

14. The method as claimed in claim 12, wherein said common subset of instructions includes a class of instructions being coprocessor instructions operable to control coprocessor data processing operations using coprocessor logic common to said first instruction set and said second instruction set.

15. The method as claimed in claim 14, wherein all unconditional coprocessor instructions are within said common subset.

16. The method as claimed in claim 12, wherein said first instruction set is a fixed length instruction set of N-bit instructions.

17. The method as claimed in claim 16, wherein N is one of 32 or 16.

18. The method as claimed in claim 12, wherein said second instruction set is a variable length instruction set.

19. The method as claimed in claim 12, wherein at least one program instruction within said common subset of instructions performs common data processing operations in either said first mode or said second mode but generates different result data values depending upon whether said instruction decoder is operating in said first mode or said second mode.

20. The method as claimed in claim 19, wherein said at least one program instruction generating different result data values includes a program counter value as an input operand.

21. The method as claimed in claim 20, wherein a different relationship is maintained between said program counter value and an address of an instruction being executed depending upon whether said instruction decoder is operating in said first mode or said second mode.

22. The method as claimed in claim 19, wherein said at least one program instruction generating different result data values includes a program status register value as an input operand.

23. A computer program product embodied in a non-transitory storage medium for storing a computer program operable to control a data processing apparatus containing data processing logic operable to perform data processing operations, said computer program comprising:

program instructions of a first instruction set and program instructions of a second instruction set, that control said data processing logic to perform said data processing operations; wherein a subset of program instructions of said first instruction set have a common storage order compensated encoding with a subset of program instructions of said second instruction set and form a common subset of instructions representing at least one class of instructions, said common subset of instructions controlling data processing logic to perform the same data processing operations independent of whether instructions of said first instruction set or of said second instruction set are being decoded.

24. The computer program product as claimed in claim 23, wherein common portions of said data processing logic are used to execute instructions of said common subset of instructions.

25. The computer program product as claimed in claim 23, wherein said common subset of instructions includes a class of instructions being coprocessor instructions operable to control coprocessor data processing operations using coprocessor logic common to said first instruction set and said second instruction set.

26. The computer program product as claimed in claim 25, wherein all unconditional coprocessor instructions are within said common subset.

27. The computer program product as claimed in claim 23, wherein said first instruction set is a fixed length instruction set of N-bit instructions.

28. The computer program product as claimed in claim 27, wherein N is one of 32 or 16.

29. The computer program product as claimed in claim 23, wherein said second instruction set is a variable length instruction set.

30. The computer program product as claimed in claim 23, wherein at least one program instruction within said common subset of instructions performs common data processing operations when instructions of either said first instruction set or said second instruction set are being decoded but generates different result data values.

31. The computer program product as claimed in claim 30, wherein said at least one program instruction generating different result data values includes a program counter value as an input operand.

32. The computer program product as claimed in claim 31, wherein a different relationship is maintained between said program counter value and an address of an instruction being executed depending upon whether said instruction decoder is operating in said first mode or said second mode.

33. The computer program product as claimed in claim 30, wherein said at least one program instruction generating different result data values includes a program status register value as an input operand.

* * * * *